(12) United States Patent
Huang et al.

(10) Patent No.: US 8,259,652 B2
(45) Date of Patent: Sep. 4, 2012

(54) LOCATION-BASED NETWORK DETECTION

(75) Inventors: Ronald Keryuan Huang, Milpitas, CA (US); Isabel Ge Mahe, Los Altos, CA (US); Jason Shi, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 340 days.

(21) Appl. No.: 12/620,421

(22) Filed: Nov. 17, 2009

(65) Prior Publication Data

US 2011/0116453 A1    May 19, 2011

(51) Int. Cl.
 *H04W 4/00* (2009.01)
(52) U.S. Cl. ......................................... 370/328; 455/434
(58) Field of Classification Search ........................ None
See application file for complete search history.

(56) References Cited

U.S. PATENT DOCUMENTS

| | | | |
|---|---|---|---|
| 6,223,042 B1 * | 4/2001 | Raffel ............................ | 455/455 |
| 6,665,540 B2 | 12/2003 | Rantalainen et al. | |
| 7,069,026 B2 * | 6/2006 | McClure .................... | 455/456.3 |
| 7,283,507 B2 | 10/2007 | Buckley et al. | |
| 7,519,372 B2 * | 4/2009 | MacDonald et al. ....... | 455/456.1 |
| 7,720,487 B2 * | 5/2010 | Kim et al. ................... | 455/456.1 |
| 2004/0127163 A1 | 7/2004 | Schramm et al. | |
| 2006/0083181 A1 | 4/2006 | Gebert et al. | |
| 2006/0121914 A1 * | 6/2006 | Kim et al. ................... | 455/456.1 |
| 2007/0275717 A1 * | 11/2007 | Edge et al. ..................... | 455/434 |
| 2008/0238766 A1 * | 10/2008 | Morgan ...................... | 342/357.1 |
| 2008/0284646 A1 * | 11/2008 | Walley et al. ............. | 342/357.09 |
| 2008/0291086 A1 * | 11/2008 | Walley et al. .................. | 342/367 |
| 2009/0149176 A1 * | 6/2009 | Vuong et al. ................... | 455/434 |

* cited by examiner

*Primary Examiner* — Robert Scheibel
(74) *Attorney, Agent, or Firm* — Fish & Richardson P.C.

(57) ABSTRACT

A mobile device establishes communication with a number of wireless cellular networks at particular locations and records the locations and network information associated with the wireless cellular networks. The network information can be used to narrow a search for an available wireless cellular network from a plurality of potentially available wireless cellular networks when the mobile device is operating at a stored location. In one aspect, a Radio Frequency (RF) receiver on a mobile device can receive a broadcast radio signal from a transmitter and use the signal to determine an approximate location of the device based on a known location of the transmitter. A match between the approximate device location and wireless cellular network transmitters in communication range of the mobile device can be used to narrow a search for wireless cellular networks.

20 Claims, 5 Drawing Sheets

LOCATION-BASED NETWORK DETECTION

TECHNICAL FIELD

This subject matter is related generally to mobile devices.

BACKGROUND

Conventional mobile devices are often dedicated to performing a specific application. For example, a mobile phone provides telephony services, a personal digital assistant (PDA) provides a way to organize addresses, contacts and notes, a media player plays content, email devices provide email communication, etc. Modern mobile devices can include two or more of these applications. Due to the size limitation of a typical mobile device, such mobile devices may need to rely on a network or other remote service to support these multiple applications. For example, a map service may provide maps to a mobile device over a network, which can be used with one or more applications running on the mobile device. The introduction of a positioning system integrated with, or coupled to, the mobile device provides additional opportunities for providing location-based services.

Modern positioning systems include satellite based positioning systems, such as Global Positioning System (GPS), cellular network positioning based on "cell IDs" and WiFi positioning technology based on a WiFi networks. In some cases, however, these positioning systems are unable to provide position data if there is poor satellite visibility (e.g., operating the device indoors) or if the positioning system is shutdown. For example, the positioning system may be shutdown when the device is in an airplane or when the device is turned off or running low on power. When the device becomes active again it is often desirable to quickly establish communication with a wireless cellular network. However, because the location of the device may be unknown when the device becomes active again, the device may require a long search time to find a wireless cellular network that is available to establish communication with.

SUMMARY

A mobile device establishes communication with a number of wireless cellular networks at particular locations and records the locations and network information associated with the wireless cellular networks. The network information can be used to narrow a search for an available wireless cellular network from a plurality of potentially available wireless cellular networks when the mobile device is operating at a stored location. In one aspect, a Radio Frequency (RF) receiver on a mobile device can receive a broadcast radio signal from a transmitter and use the signal to determine an approximate location of the device based on a known location of the transmitter. A match between the approximate device location and wireless cellular network transmitters in communication range of the mobile device can be used to narrow a search for wireless cellular networks.

DETAILED DESCRIPTION

System Overview

Figure 1:
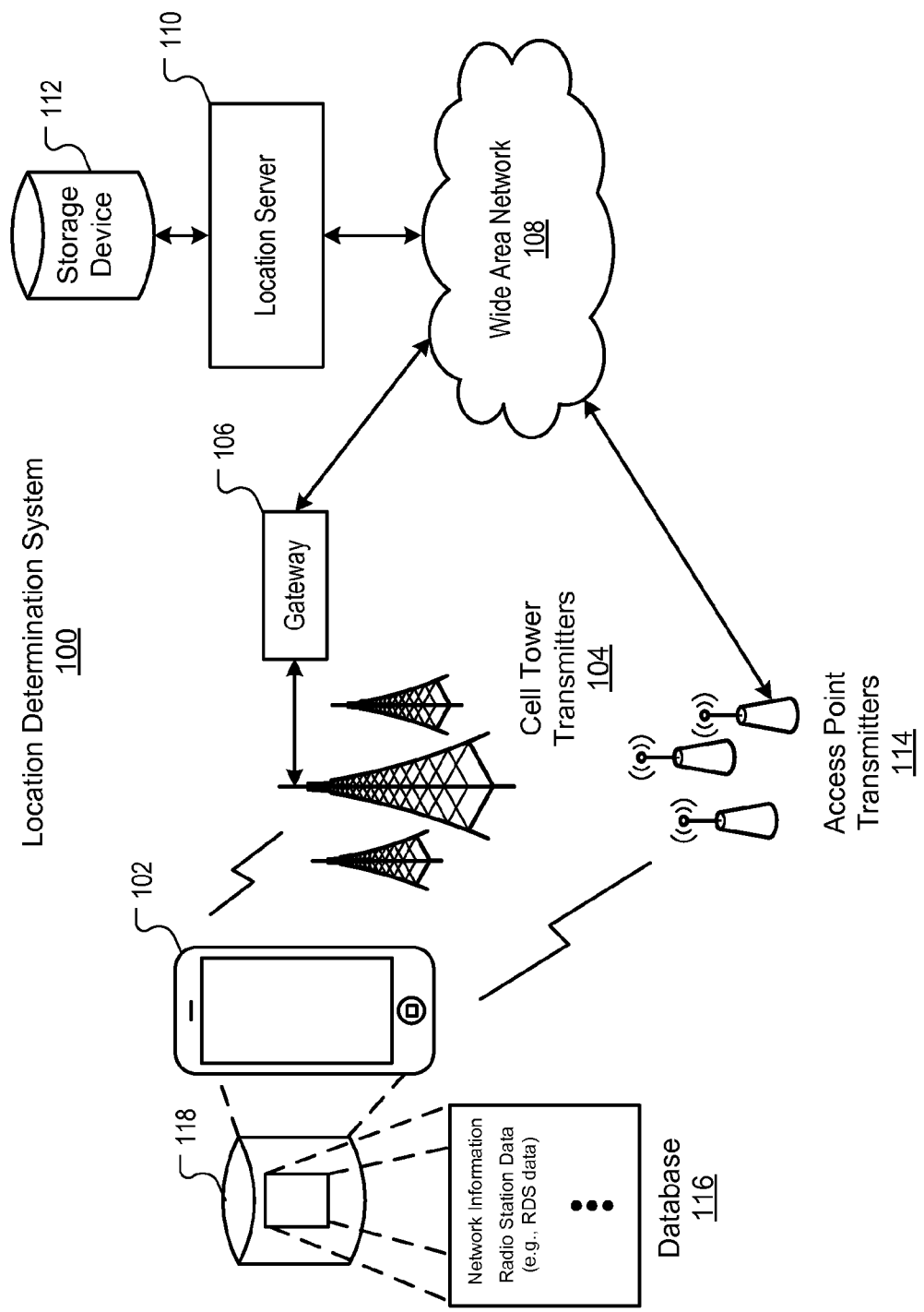
FIG. 1 is a block diagram of an exemplary location determination system.

FIG. 1 is a block diagram of an exemplary location determination system 100. In some implementations, location determination system 100 can include mobile device 102, cellular tower transmitters 104, access point transmitters 114 (e.g., WiFi beacons), and location server 110. Cellular tower transmitters 104 can be coupled to wide area network 108 (e.g., the Internet) through gateway 106, and access point transmitters 114 can be coupled to network 108 through wired and/or wireless communication links.

Mobile device 102 can be any device capable of determining its current geographic location by communicating with a positioning system, such as GPS, cellular networks, WiFi networks, and any other technology that can be used to provide the actual or estimated location of a mobile device 102. Some examples of mobile devices include but are not limited to: a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices. Mobile device 102 can include storage device 118 (e.g., flash memory, hard disk) for storing database (DB) 116.

Location server 110 can include one or more server computers operated by a location service provider. Location server 110 can deliver location information to mobile device 102. In some implementations, mobile device 102 collects and stores network information associated with transmitter detection events. The network information can include a transmitter identifier (ID) of a detected transmitter, a timestamp marking a time of the transmitter detection event and a location, if available. Some examples of transmitter IDs include but are not limited to Cell IDs provided by cell tower transmitters in a cellular communications network (e.g., transmitters on GSM masts) and access point transmitter IDs (e.g., a Media Access Control (MAC) address). A wireless access point (AP) can be a hardware device or a computer's software that acts as a communication hub for users of a wireless device to connect to a wired LAN. Other examples of cellular network information include Mobile Country Code (MCC), Mobile Network Code (MNC) and Location Area Code (LAC).

The transmitter IDs can be correlated with known geographic locations of corresponding transmitters. The geographic locations of the transmitters can be used to compute estimated position coordinates (e.g., latitude, longitude, altitude) for mobile device 102 over a period of time. For example, a sequence of transmitter IDs can be compared with a reference database (e.g., Cell ID database, WiFi reference database) that maps or correlates the transmitter IDs to position coordinates of corresponding transmitters, and computes estimated position coordinates for mobile device 102 based at least in part on the position coordinates of the corresponding transmitters. If a reference database is available on mobile device 102, then the mapping can be performed by a processor of mobile device 102. Alternatively, the transmitter IDs can be sent to location server 110 which can store transmitter position coordinates in a remote reference database in storage device 112. Location server 110 can map or correlate transmitter IDs to position coordinates of corresponding transmitters which can be sent back to mobile device 102 through network 108 and one or more wireless communication links. The position coordinates can be reverse geocoded to map locations (e.g., street locations). The map locations can be represented by markers (e.g., pushpin icons) on a map view displayed by mobile device 102, or used for other purposes by mobile applications. The position coordinates and associated timestamps can be stored in database 116 and/or storage device 112 for subsequent retrieval and processing by a user or application. The position coordinates and timestamps can be used to construct a timeline in a map view showing a history of locations for mobile device 102.

A baseband processor in mobile device 102 can be used in a RF subsystem to transmit and receive RF signals in, for example, GSM (Global System for Mobile communications), GPRS (General Packet Radio Service) and EGPRS (Enhanced General Packet Radio Service). During reception of RF signals, the RF subsystem receives RF signals, converts the RF signals into baseband signals and sends the baseband signals to the baseband processor. Thereafter, the baseband processor processes the received baseband signals to decodes various data from the baseband signals.

In some implementations, mobile device 102 can store network information (e.g., transmitter IDs) for wireless cellular networks that have communicated with mobile device 102. The network information and location where the communication occurred can be stored in a local database (e.g., database 116) on mobile device 102. When mobile device 102 determines that it is operating at a location previously stored in the database (e.g., determined by matching current GPS location data with stored locations), then the stored network information corresponding to the matched stored location can be used to narrow a search for available wireless cellular networks at the matched location. For example, when mobile device 102 wakes up or exits a mode where wireless access was not available (e.g., an "airplane mode"), the matched location of the mobile device 102 can be used to determine a list of wireless cellular networks that are potentially available for access at the matched location.

In some implementations, location-sorted network information can be pre-stored on mobile device 102 even if mobile device 102 has never been at the matched location.

In some implementations, the list of wireless cellular networks can be searched in order based on one or more characteristics or attributes of the transmission signal. For example, signal strength can be recorded as part of the network information and used to narrow a search to only those wireless cellular networks potentially accessible at the location and that have signal strengths that exceed a certain threshold. In some implementations, the location-sorted network information can include the frequency band and channel information (e.g., for 3G, 2G) for each network in the approximate location of the mobile device 102 to significantly reduce network search time even further.

Figure 2:
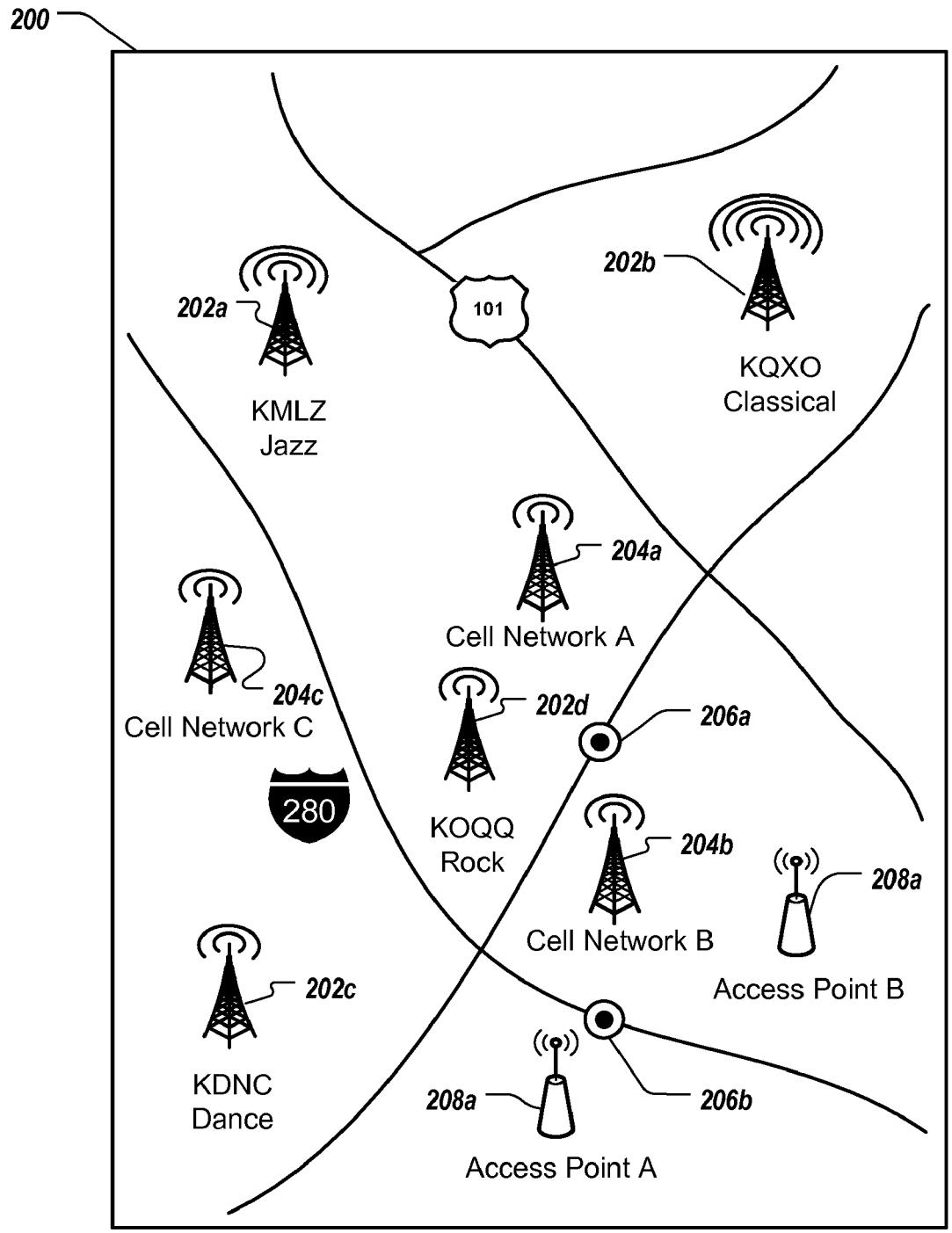
FIG. 2 illustrates location based network detection using RF broadcast signals.
Figure 3:
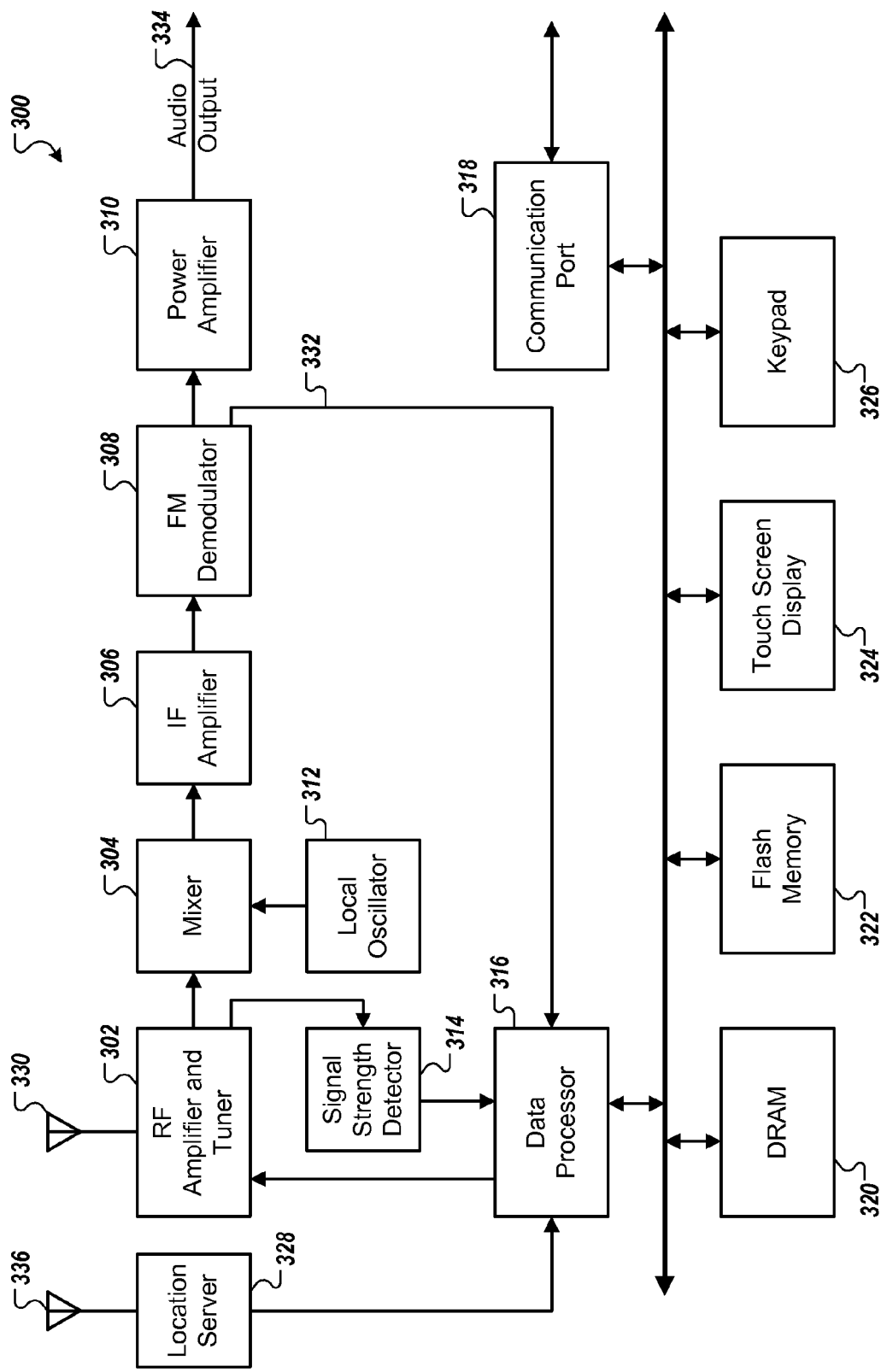
FIG. 3 is a block diagram of an example radio receiver for location based network detection.

In some implementations where the mobile device is being operated in a new location (no previously stored network information), a broadcast radio system in the device 102 can be used to determine an approximate location of mobile device 102, as described in reference to FIGS. 2-3.

Location Based Network Detection Using Broadcast Radio Signals

FIG. 2 illustrates location based network detection using broadcast radio signals. In some implementations, device 102 can include a broadcast radio receiver operable to receive broadcast radio signals from broadcast radio signal sources (e.g., broadcast radio stations). The receiver can include processing circuitry operable to determine respective call station identification information (e.g., call sign) for each of the broadcast radio signal sources from the broadcast radio signals. Signal quality characteristics (e.g., signal strength) can be measured for each of the received broadcast radio signals. Station position data (e.g., longitude, latitude) associated with each of the broadcast radio signal sources can be identified from the call station identification information. In some implementations, an approximate location of device 102 can be determined using the signal quality characteristics and station position data associated with at least three broadcast radio signal sources. The signal quality characteristics and corresponding station position data can be stored in a database on device 102 (e.g., database 116) or on a network (e.g., database 112).

Referring now to FIG. 2, an example scenario for using location based network detection is illustrated. A map display 200 can include locations of broadcast radio stations 202*a*, 202*b*, 202*c* and 202*d*. Also shown are wireless cellular networks 204*a*, 204*b* and 204*c* and access points 208*a* and 208*b*. A device at location 206*a* can receive broadcast radio signals from broadcast radio stations 202*a*-202*d*. In some implementations, a tuner in the device can measure the signal strengths from each of the stations 202*a*-202*d*. The station position data for the broadcast radio station having the strongest signal can be selected as a reference location for the device. In some implementations, at least three radio stations can be used to triangulate an approximate location of device 102 using known trilateralization methods. For example, distances between mobile device 102 and two or more broadcast radio transmitter antennas can be calculated based on signal strengths and time delays between reception of the broadcast radio signals from the three transmitters, and from this distance data, an approximate position of mobile device 102 can be calculated.

In response to a request to communicate with a wireless cellular network, a baseband processor can scan for available wireless cellular networks. The scanning can take several minutes. However, the scanning or search time can be reduced by comparing the station position data with known transmitter locations for wireless cellular networks. The search for wireless cellular networks can be narrowed to those wireless cellular networks having transmitter locations closest to the station position data. In the example shown, broadcast radio station 202*d* (KOQQ) is transmitting the strongest signal indicating that it is closest to the current location of device 102 (location 206*a*). Consequently, the station position data for station 202*d* is compared to position data for wireless cellular network transmitters to determine which wireless cellular network is closest to the current location of device 102. In this example, wireless cellular network 204*b* has the shortest physical distance to broadcast radio station 202*d* (which is the approximate position of device 102). The baseband processor attempts to establish communication with wireless cellular network 204*b*. If the attempt fails, then the baseband processor will attempt to establish communication with wireless cellular network 204*a* which is the next closest wireless cellular network and so forth.

In some implementations, Radio Data System (RDS) or Radio Broadcast Data System (RBDS) can be used to retrieve station position data. For example, RDS is a communications protocol standard for embedding small amounts of digital information in conventional FM radio broadcasts. The RDS system standardizes several types of information transmitted, including time, station identification and program information. The station identification can be retrieved from the RDS data and used to index a database of radio station locations. The database can be local to the device (e.g., database 116) or accessible from a network through a server (e.g., database 112).

In some implementations, the approximate position of device 102 determined from Broadcast radio signals can be used to perform various actions, such as setting a time zone, downloading local maps from a network resource, localizing applications (e.g., populating a weather widget or calendar) and any other location based service.

Example Radio Receiver for Location Based Network Detection

FIG. 3 is a block diagram of an example radio receiver 300 for location based network detection. In some implementations, radio receiver 300 can include antenna 328 connected to RF tuner 302, which selects and amplifies a narrow band signal from the signal received at antenna 328 and sends the narrow band signal to mixer 304. Mixer 304 mixes the narrow band RF signal with an oscillation signal from local oscillator 312 to generate an IF signal that is amplified by IF amplifier 306. The amplified IF signal is demodulated by demodulator 308 and further amplified by power amplifier 310 to generate audio output signal 334, which can include, e.g., mono, stereo, or surround audio. In some examples, demodulator 308 can generate auxiliary information 332 contained in a sideband signal, such as station call letters. Auxiliary information 332 is sent to data processor 316. RF tuner 302 can be adjusted to tune to various frequencies to selectively receive signals from various radio stations. The center frequency of RF tuner 302 (the frequency that RF tuner 302 is tuned to) can be controlled by data processor 316. Signal strength detector 314 measures the strength of the received radio signal and forwards the signal strength information to data processor 316.

In some implementations, data processor 316 executes software instructions or code to control various components of radio receiver 300, enabling receiver 300 to perform various functions, such as determining a current position, retrieving information on user preferences, identifying broadcast radio stations (e.g., stations 202a-202d) in the vicinity of receiver 300, estimating broadcast signal strength of the radio stations or other signal quality metrics.

Radio receiver 300 can include a volatile memory device, such as dynamic random access memory (DRAM) device 320, and a non-volatile memory device, such as flash memory device 322 or a hard disk drive, for storing data and program instructions or code. Location sensor 328 detects a position of radio receiver 300. Radio receiver 300 includes input/output devices, such as keypad 326 and a display (e.g., touch screen display 324). Communication port 318 enables radio receiver 300 to connect to a network (e.g., the Internet).

Flash memory device 322 may store a database having information about the locations of broadcast radio stations at various geographical regions. Broadcast radio stations 300 can also connect to a network through communication port 318 to access a proprietary or public database having information on the locations of various broadcast radio stations. Flash memory device 322 may store a database having information about broadcast signal strength contours of various primary stations. Radio receiver 300 can also connect to the network through communication port 318 to access a proprietary or public database having information on the broadcast signal strength contours.

Data processor 316 can estimate the broadcast signal strength of broadcast radio stations based on the location of radio receiver 300 and the information about broadcast signal strength contours of the broadcast radio station. The broadcast signal strength of a broadcast radio station at the location of radio receiver 200 can be estimated by looking up or interpolating broadcast signal strength contour values, or by applying an algorithm to the broadcast signal strength contour values. If only a rough estimate is required, the measured signal strength at the receiver can be considered to be inversely proportional to the distance between mobile device 102 and a transmitter tower.

Radio receiver 300 can be a stand alone product or be part of a larger system. For example, radio receiver 300 can be part of a mobile phone and shares data processor 316 and memory with other mobile phone components. Radio receiver 300 can be a device that is attached to a notebook computer through a wired or wireless interface, e.g., a universal serial bus (USB) connection, and shares the data processor and memory of the notebook computer. Radio receiver 300 can be a peripheral card that is configured to be inserted into a peripheral card slot of a notebook computer.

Example Process for Location Based Network Detection

Figure 4:
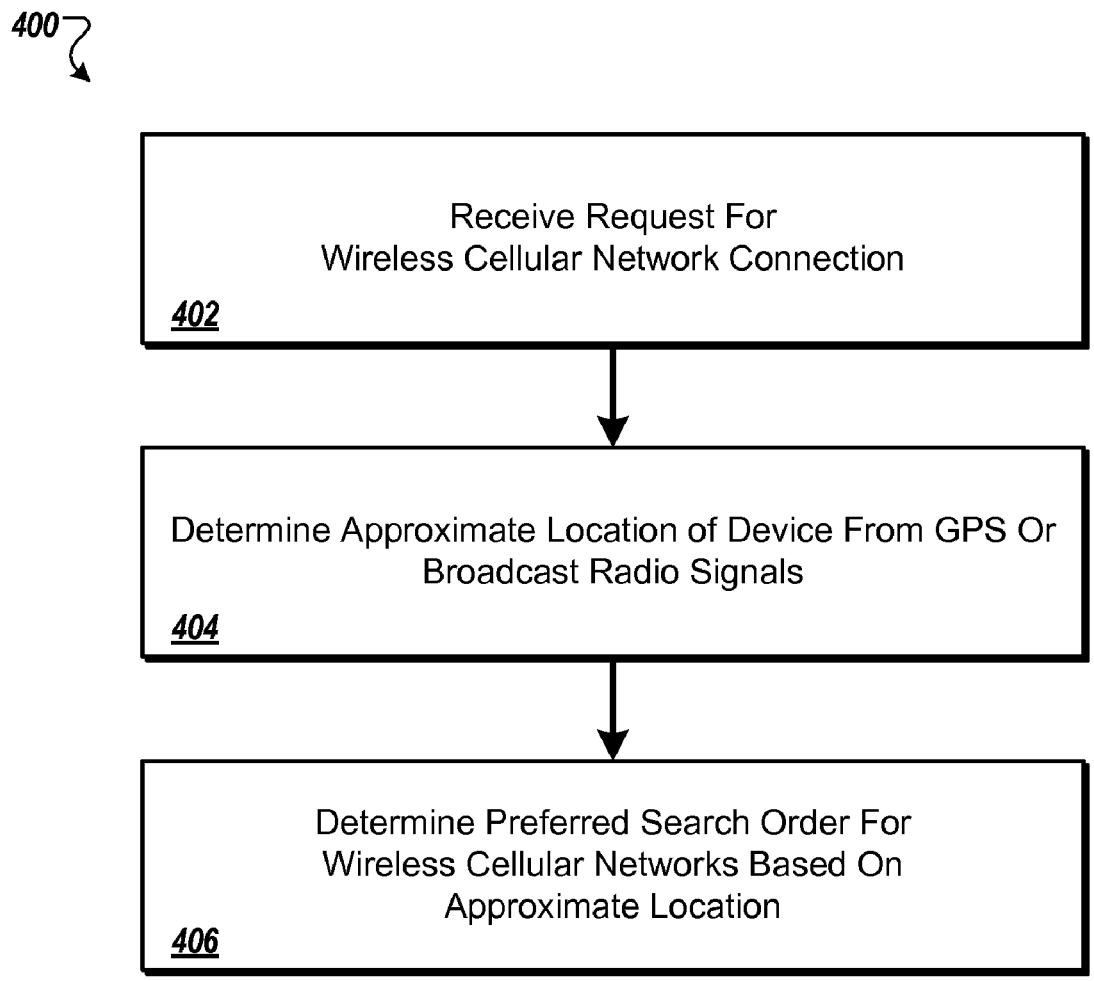
FIG. 4 is a flow diagram of an example process for location based network detection.

FIG. 4 is a flow diagram of an example process 400 for location based network detection. The process 400 will be described in reference to system 300 that performs process 400.

In some implementations, process 400 begins when a request for wireless communication with a wireless cellular network is received (402). For example, a request may be received by system 300 when device 102 is transitioned out of an "airplane" mode by a user. Alternatively, a request can be received when device 102 is turned on, rebooted or commanded by a user or application running on device 102 to search for wireless cellular networks. Responsive to the request, GPS or broadcast radio signals can be analyzed to determine an approximate location of the mobile device (404). For example, the signal strengths of the broadcast radio signals can be measured. The station position data for the station transmitting the broadcast radio signal with the highest signal strength or power can be selected as an approximate location of mobile device. Other signal characteristics can also be considered in the analysis such as the transmission power and/or transmission range of the transmitter. If GPS is available, then position information provided by the GPS receiver can be used as the approximate location of the device.

In some implementations, a radio receiver on the mobile device can use a signature of one or more radio stations broadcasting in the area of the mobile device to determine approximate location of the mobile device. The signature can be, for example, a station identification or call sign that is transmitted in a broadcast radio signal using RDS or RBDS. Because of the relatively small number of radio frequency broadcast transmitters in the world, their frequencies and locations can be stored locally on the mobile device (e.g., stored in database 116).

A wireless cellular network search order can be determined from the approximate location (406). If GPS is available, then the location provided by the GPS receiver can be used to look up network information for the approximate location from a database. The network information can include network identifying and/or access information that can be used to construct a list of wireless cellular networks that are potentially available for communication with mobile device 102 at the approximate location of mobile device 102.

If GPS is not available, stored transmitter data (e.g., broadcast radio station IDs) can be compared to broadcast radio signal data that is currently being received by the radio receiver on the mobile device. For example, an FM radio station may be transmitting a broadcast radio signal at 105 MHz, including a station ID generated by an RDS. The local database can store the station ID and a corresponding station position (e.g., latitude, longitude, altitude). When the radio broadcast station is received by the radio broadcast receiver of the mobile device, a lookup can be performed on the local database (or look up table) to determine the location of the broadcast radio signal source (e.g. the radio station location). When multiple broadcast radio signals are received, the signal with the most power can be determined, and the location of its source can be set as the approximate location of the mobile device for purposes of generating a search order of wireless cellular networks. Alternatively, two or more broadcast radio signals can be used to trilateralize an approximate location of the mobile device using known trilateralization techniques.

Once a network search order or list is determined, a baseband processor on the mobile device can automatically attempt to establish communication with the first wireless cellular network in the list, and if unsuccessful, continue down the list until a network connection is successfully established or the list is exhausted which ever occurs first. Alternatively, a user can manually select a network from the list of networks that are potentially available for communication at the location.

Example Mobile Device Architecture

Figure 5:
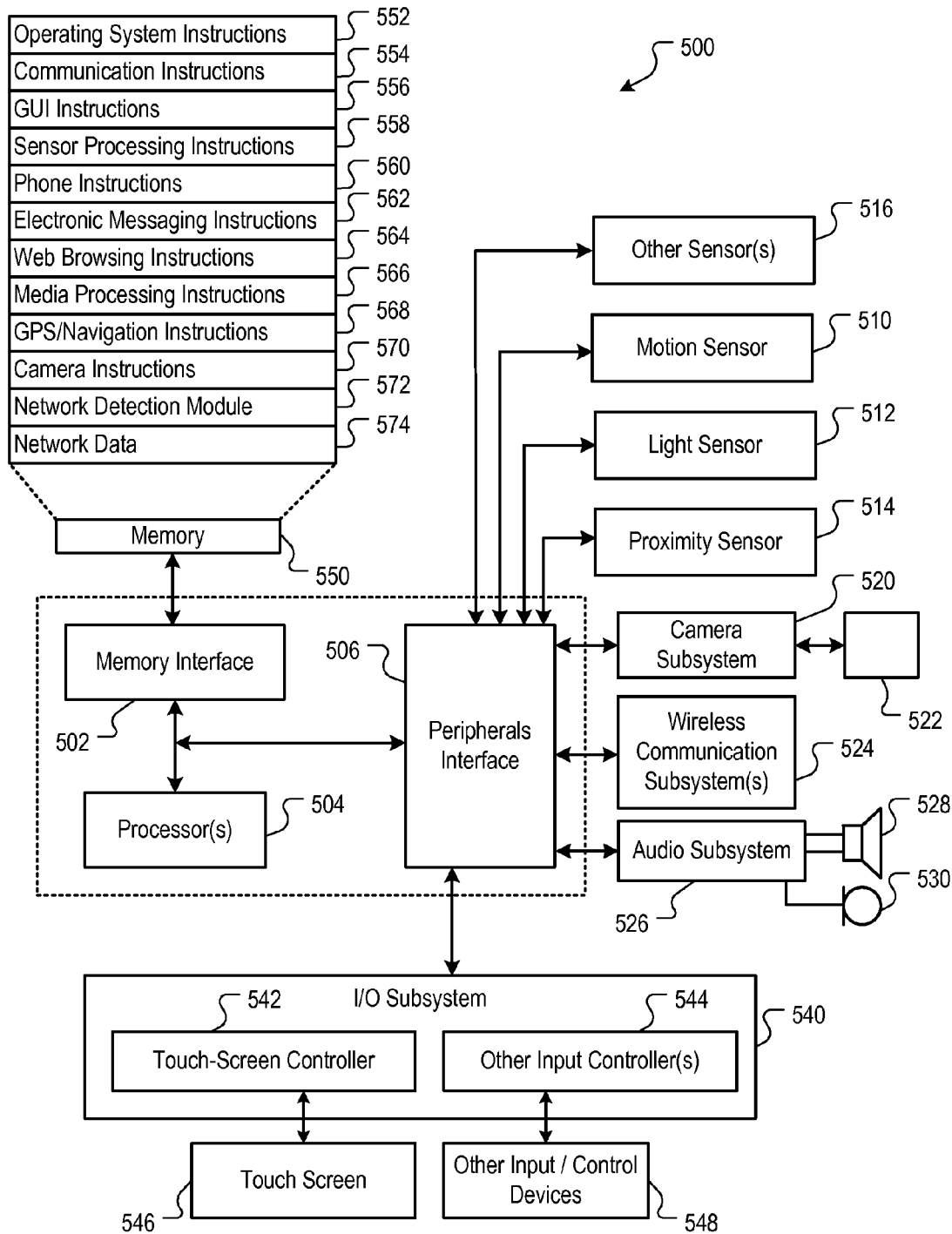
FIG. 5 is a schematic diagram of an example architecture for a mobile device capable of location based network protection.

FIG. 5 is a schematic diagram of an example architecture for a mobile device capable of location based network protection. The mobile device can include memory interface 502, one or more data processors, image processors and/or central processing units 504, and peripherals interface 506. Memory interface 502, one or more processors 504 and/or peripherals interface 506 can be separate components or can be integrated in one or more integrated circuits. The various components in the device can be coupled by one or more communication buses or signal lines.

Sensors, devices, and subsystems can be coupled to peripherals interface 506 to facilitate multiple functionalities. For example, motion sensor 510, light sensor 512, proximity sensor 514 can be coupled to peripherals interface 506 to facilitate orientation, lighting, and proximity functions. Other sensors 516 can also be connected to peripherals interface 506, such as a positioning system (e.g., GPS receiver), a temperature sensor, a biometric sensor, magnetic compass, FM or satellite radio, or other sensing device, to facilitate related functionalities. An example FM radio is radio receiver 300 described in reference to FIG. 3. The positioning system can provide the functions of location server 328 described in reference to FIG. 3.

Camera subsystem 520 and optical sensor 522, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 524, which can include radio frequency receivers and transmitters and/or optical (e.g., infrared) receivers and transmitters. The specific design and implementation of communication subsystem 524 can depend on the communication network(s) over which device 102 is intended to operate. For example, device 102 may include communication subsystems 524 designed to operate over a GSM network, a GPRS network, an EDGE network, a WiFi or WiMax network, and a Bluetooth™ network. In particular, wireless communication subsystems 524 may include hosting protocols such that device 102 may be configured as a base station for other wireless devices.

Audio subsystem 526 can be coupled to speaker 528 and microphone 530 to facilitate voice-enabled functions, such as voice recognition, voice replication, digital recording, and telephony functions.

I/O subsystem 540 can include touch screen controller 542 and/or other input controller(s) 544. Touch-screen controller 542 can be coupled to touch screen 546. Touch screen 546 and touch screen controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 546.

Other input controller(s) 544 can be coupled to other input/control devices 548, such as one or more buttons, rocker switches, thumb-wheel, infrared port, USB port, and/or a pointer device such as a stylus. One or more buttons (not shown) can include an up/down button for volume control of speaker 528 and/or microphone 530.

In one implementation, a pressing of the button for a first duration may disengage a lock of touch screen 546; and a pressing of the button for a second duration that is longer than the first duration may turn power to device 102 on or off. The user may be able to customize a functionality of one or more of the buttons. Touch screen 546 can, for example, also be used to implement virtual or soft buttons and/or a keyboard. In addition to touch screen 546, device 102 can also include a touch pad.

In some implementations, device 102 can present recorded audio and/or video files, such as MP3, AAC, and MPEG files. In some implementations, device 102 can include the functionality of an MP3 player, such as an iPod™. Device 102 may, therefore, include a connector that is compatible with the iPod™. Other input/output and control devices can also be used.

Memory interface 502 can be coupled to memory 550. Memory 550 can include high-speed random access memory and/or non-volatile memory, such as one or more magnetic disk storage devices, one or more optical storage devices, and/or flash memory (e.g., NAND, NOR). Memory 550 can store an operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 can be a kernel (e.g., UNIX kernel).

Memory 550 may also store communication instructions 554 to facilitate communicating with one or more additional devices, one or more computers and/or one or more servers. Memory 550 may include graphical user interface instructions 556 to facilitate graphic user interface processing, such as described in reference to FIGS. 1-4; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes and instructions; camera instructions 570 to facilitate camera-related processes and functions; and network detection module 572 and network data 574 to facilitate the processes and functions described in reference to FIGS. 1-4. Memory 550 may also store other software instructions (not shown), such as web video instructions to facilitate web video-related processes and functions; and/or web shopping instructions to facilitate web shopping-related processes and functions. In some implementations, media processing instructions 566 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 550.

Each of the above identified instructions and applications can correspond to a set of instructions for performing one or more functions described above. These instructions need not be implemented as separate software programs, procedures, or modules. Memory 550 can include additional instructions or fewer instructions. Furthermore, various functions of device 102 may be implemented in hardware and/or in software, including in one or more signal processing and/or application specific integrated circuits.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, e.g., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more processors of a mobile device, the method comprising:
   receiving a plurality of broadcast radio signals;
   processing the broadcast radio signals to determine a location for a source of a broadcast radio signal having a strongest received broadcast radio signal strength;
   determining a plurality of wireless cellular networks that each have a transmitter located within a predetermined distance from the source;
   establishing a search order for the plurality of wireless cellular networks based on proximity of the transmitters to the source; and
   searching for at least one of the plurality of wireless cellular networks based on the search order.

2. The method of claim 1, where the broadcast radio signals are Frequency Modulated (FM) or Amplitude Modulated (AM) signals.

3. The method of claim 1, where processing the broadcast radio signals further comprises:
   retrieving information from each of the broadcast radio signals identifying a source of the broadcast radio signal; and
   determining a location for the source of the broadcast radio signal from the identifying information.

4. The method of claim 3, where retrieving information comprises retrieving station identification information included in the broadcast radio signals by Radio Data Systems or Radio Broadcast Data systems.

5. The method of claim 1, where establishing a search order for the plurality of wireless cellular networks further comprises:
   comparing strengths of the broadcast radio signals; and
   establishing the search order based on results of the comparing.

6. The method of claim 5, where signal strengths of the broadcast radio signals are estimated using broadcast signal strength contours of a source of the broadcast radio signal.

7. The method of claim 1, where the plurality of wireless cellular networks are cellular networks.

8. A method performed by one or more processors of a mobile device, the method comprising:
   determining a location of a broadcast radio signal source;
   comparing the location to a list of locations previously stored in a database;
   upon finding a matching location, determining a plurality of wireless cellular networks potentially available for communication with the mobile device at the matching location;
   defining a search order for the plurality of wireless cellular networks based on proximity of transmitters of the plurality of wireless cellular networks to the location of the broadcast radio signal source; and
   automatically searching for an available wireless cellular network in accordance with the search order.

9. The method of claim 8, where the plurality of wireless cellular networks are cellular networks.

10. The method of claim 9, where defining a search order further comprises:
    defining a search order based on network information, where the network information includes one or more of Mobile Country Code (MCC), Mobile Network Code (MNC), Location Area Code (LAC), frequency band or channel information.

11. The method of claim 8, where defining a search order further comprises:
    defining a search order based on network information, where the network information includes signal strengths.

12. A mobile device, comprising:
    a memory storing computer program instructions;
    a processor coupled to the memory and operable for executing the instructions to perform operations comprising:
      receiving a plurality of broadcast radio signals;
      processing the broadcast radio signals to determine a location for a source of a broadcast radio signal having a strongest received broadcast radio signal strength;
      determining a plurality of wireless cellular networks that each have a transmitter located within a predetermined distance from the source;
      establishing a search order for the plurality of wireless cellular networks based on proximity of the transmitters to the source; and
      searching for at least one of the plurality of wireless cellular networks based on the search order.

13. The device of claim 12, where the broadcast radio signals are Frequency Modulated (FM) or Amplitude Modulated (AM) signals.

14. The device of claim 12, where processing broadcast radio signals further comprises:
    retrieving information from each of the broadcast radio signals identifying a source of the broadcast radio signal; and
    determining a location for the source of the broadcast radio signal from the identifying information.

15. The device of claim 14, where retrieving information comprises retrieving station identification information included in the broadcast radio signals by Radio Data Systems or Radio Broadcast Data systems.

16. The device of claim 12, where establishing a search order for the plurality of wireless cellular networks further comprises:
    comparing strengths of the broadcast radio signals; and
    establishing the search order based on results of the comparing.

17. The device of claim 16, where signal strengths of the broadcast radio signals are estimated using broadcast signal strength contours of a source of the broadcast radio signal.

18. The method of claim 12, where the plurality of wireless cellular networks are cellular networks.

19. A mobile device, comprising:

a memory storing computer program instructions;

a processor coupled to the memory and operable for executing the instructions to perform operations comprising:

determining a location of a broadcast radio signal source;

comparing the location to a list of locations previously stored in a database;

upon finding a matching location, determining a plurality of wireless cellular networks potentially available for communication with the mobile device at the matching location;

defining a search order for the plurality of wireless cellular networks based on proximity of transmitters of the plurality of wireless cellular networks to the location of the broadcast radio signal source; and automatically searching for an available wireless cellular network in accordance with the search order.

20. The device of claim 19, where defining a search order further comprises:

defining a search order based on network information, where the network information includes signal strengths.

* * * * *

UNITED STATES PATENT AND TRADEMARK OFFICE
CERTIFICATE OF CORRECTION

PATENT NO. : 8,259,652 B2
APPLICATION NO. : 12/620421
DATED : September 4, 2012
INVENTOR(S) : Ronald Keryuan Huang Page 1 of 1

It is certified that error appears in the above-identified patent and that said Letters Patent is hereby corrected as shown below:

In claim 18, column 13, line 4, delete "method" and insert --device--, therefor.

Signed and Sealed this
Twenty-ninth Day of January, 2013

David J. Kappos
*Director of the United States Patent and Trademark Office*